(12) United States Patent
Kauppila (10) Patent No.: US 8,322,385 B2
(45) Date of Patent: Dec. 4, 2012

(54) DOUBLE CHAIN SAW ARRANGEMENT FOR TRAIL CLEARING

(76) Inventor: Richard W. Kauppila, Negaunee, MI (US)

( * ) Notice: Subject to any disclaimer, the term of this patent is extended or adjusted under 35 U.S.C. 154(b) by 432 days.

(21) Appl. No.: 12/387,456

(22) Filed: May 1, 2009

(65) Prior Publication Data

US 2009/0272462 A1    Nov. 5, 2009

Related U.S. Application Data

(60) Provisional application No. 61/126,117, filed on May 1, 2008.

(51) Int. Cl.
*A01G 23/095*   (2006.01)
*B27B 17/00*    (2006.01)

(52) U.S. Cl. ............ 144/24.13; 30/379; 30/381; 30/382

(58) Field of Classification Search .................. 144/4.1, 144/24.13, 34.1, 34.5; 30/381–387, 123.4, 30/515, 397, 397.5; 83/788, 803, 804, 808, 83/797, 795, 928; 56/15.1, 15.2, 235, 238, 56/255, 295, 315, 319, 320, 233
See application file for complete search history.

(56) References Cited

U.S. PATENT DOCUMENTS

| | | | |
|---|---|---|---|
| 1,553,672 A | 9/1925 | Northall | |
| 1,559,522 A | 10/1925 | Frunk | |
| 1,710,970 A | 4/1929 | Northall | |
| 2,348,588 A * | 5/1944 | Arsneau | 144/34.1 |
| 2,555,428 A | 6/1951 | Tuttle | |
| 2,618,350 A * | 11/1952 | Von Ruden | 180/53.1 |
| 2,664,925 A | 1/1954 | Jacobs et al. | |
| 2,746,492 A * | 5/1956 | De Hardit | 144/34.1 |
| 2,800,153 A | 7/1957 | Barth | |
| 2,815,048 A | 12/1957 | Davis | |
| 2,831,511 A * | 4/1958 | Hedblom | 83/425.2 |
| 3,078,886 A * | 2/1963 | Childress | 144/208.1 |
| 3,115,739 A * | 12/1963 | Thoen et al. | 56/6 |
| 3,192,695 A * | 7/1965 | Leydig et al. | 56/235 |
| 3,565,372 A * | 2/1971 | Jones | 248/647 |
| 3,599,403 A * | 8/1971 | Gantz | 56/10.4 |
| 3,604,479 A * | 9/1971 | Jordan | 144/34.1 |
| 3,612,127 A * | 10/1971 | Benno | 83/808 |
| 3,665,685 A * | 5/1972 | Allard | 56/10.4 |
| 3,726,326 A * | 4/1973 | Coleman | 144/34.1 |
| 4,063,359 A * | 12/1977 | Luscombe | 30/379.5 |
| 4,083,291 A * | 4/1978 | Larsson | 91/517 |
| 4,273,169 A * | 6/1981 | Baenen | 144/34.1 |
| 4,291,492 A * | 9/1981 | Reynolds et al. | 47/12 |
| 4,501,310 A * | 2/1985 | Valdes et al. | 144/34.1 |
| 4,707,971 A * | 11/1987 | Forpahl et al. | 56/6 |
| 4,760,646 A * | 8/1988 | Siegler | 30/382 |
| 4,885,902 A * | 12/1989 | Schmidt | 56/8 |
| 5,123,168 A * | 6/1992 | Lyons | 30/382 |
| 5,341,629 A * | 8/1994 | Penner | 56/15.2 |
| 5,390,715 A * | 2/1995 | Luscombe | 144/24.13 |

(Continued)

*Primary Examiner* — David J. Walczak
*Assistant Examiner* — Jennifer C Chiang
(74) *Attorney, Agent, or Firm* — John R. Benefiel (57) ABSTRACT

A double chain saw arrangement which has diametrically oppositely extending chain saws powered by a single motor driving two sprockets on said hub, each engaged with an associated chain saw chains on each chain saw bar mounted to the hub. A series of hooked capture pieces project from one side of the chain saw bars in a plane parallel to the chain saw bars, which pieces act to cause brush and limbs to be captured and forced into contact with the saw chains to be cut thereby.

7 Claims, 7 Drawing Sheets

U.S. PATENT DOCUMENTS

| | | | | |
|---|---|---|---|---|
| 5,430,998 | A * | 7/1995 | Albrecht | 56/8 |
| 5,884,403 | A * | 3/1999 | Rogers | 30/296.1 |
| 6,085,505 | A * | 7/2000 | Edwards | 56/15.2 |
| 6,167,928 | B1 * | 1/2001 | Jarman | 144/336 |
| 6,536,119 | B1 * | 3/2003 | Carr | 30/371 |
| 6,718,661 | B1 * | 4/2004 | Miller | 37/403 |
| 6,860,093 | B2 * | 3/2005 | Scordilis | 56/15.2 |
| 6,959,528 | B1 * | 11/2005 | Scordilis | 56/15.8 |
| 6,990,770 | B2 * | 1/2006 | Terrell | 47/1.5 |
| 7,363,754 | B2 * | 4/2008 | Cartner | 56/10.4 |
| 7,418,985 | B2 * | 9/2008 | Torgersen | 144/4.1 |

* cited by examiner

DOUBLE CHAIN SAW ARRANGEMENT FOR TRAIL CLEARING

CROSS REFERENCE TO RELATED APPLICATIONS

This application claims the benefit of U.S. provisional patent application No. 61/126,117 filed on May 1, 2008.

BACKGROUND OF THE INVENTION

This invention concerns brush cutting and tree delimbing carried out in keeping hiking and snowmobile trails, right of ways for utilities, etc., clear of vegetation.

Such operations involve cutting brush and tree limbs which grow into the trail space. Trail systems are extensive, extending for miles such that power equipment has been developed for this purpose, comprising a wheeled groomer vehicle having cutting devices mounted on a boom able to be maneuvered to either side of the trail.

The space defined across and above the trail is large and thus the utility to sweep that space with cutting tools in a minimum time is a prime advantage in carrying out the trail grooming.

A chain saw attached to a boom has been employed to cut free limbs, but are slow since each limb must be cut individually. Chain saws are generally ineffective to cut twigs and brush as they are often just pushed away from the saw chain.

Chain saws of a length beyond the standard length are costly such that the size of the swath able to be cut is limited as a practical matter.

It is an object of the present invention to provide a cutting device which can rapidly and effectively cut a wide swath of brush as well as several tree limbs at one time but which also is moderate in cost to manufacture.

SUMMARY OF THE INVENTION

The above object and other objects which will become apparent upon a reading of the following specification and claims are achieved by a boom mountable double chain saw in which two chain saw bars project out in diametrically opposite directions from a central hub where two aligned chain sprockets are mounted driven by a drive motor which can be electric or hydraulic.

A series of mildly hooked capturing pieces are mounted, projecting from one said of both saw chain bars which capture limbs and brush which are forced in against the chain by engagement with the capturing pieces and by the boom and chain motions so as to be quickly cut.

The intermediate central location of the drive motor between the chain saws allows cutting close to the ground while keeping the drive motor sufficiently high when cutting close to the ground with the lower chain saw to reduce the vulnerability of the motor and the connections, hoses, etc., to impact with rocks, etc.

The double chain saw arrangement can be mounted to the outer end of a vehicle carried boom, with connections providing for pivoting to different angles with respect to the boom.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
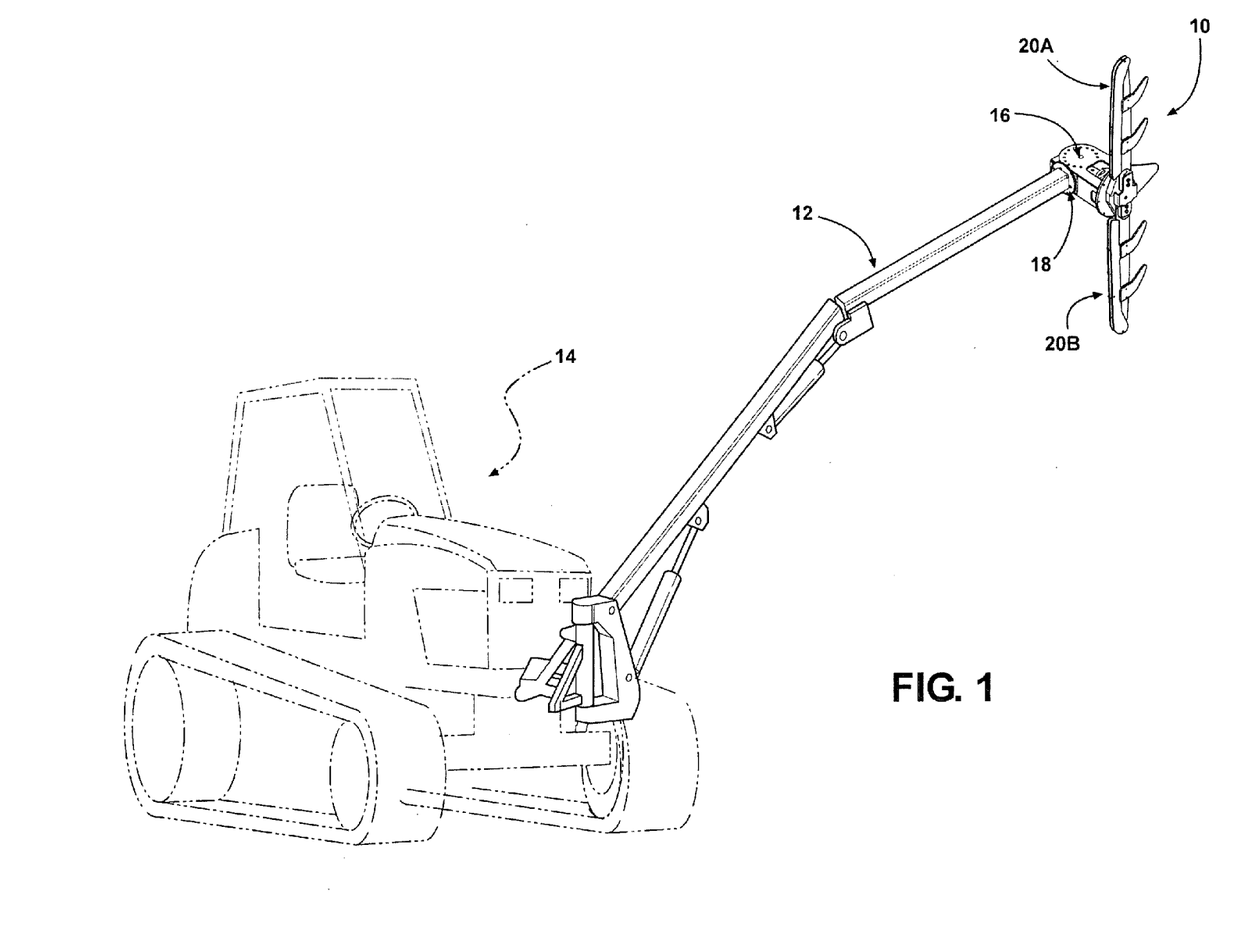
FIG. 1 is a pictorial view of a groomer vehicle equipped with a double chain saw arrangement according to the invention.

Referring to FIG. 1, the present invention comprises a double chain saw arrangement 10 useful for cleaning brush and tree limbs along trails, rights of way, etc., mounted on a boom 12 attached to a grooming vehicle 14 of a known type.

Figure 2A:
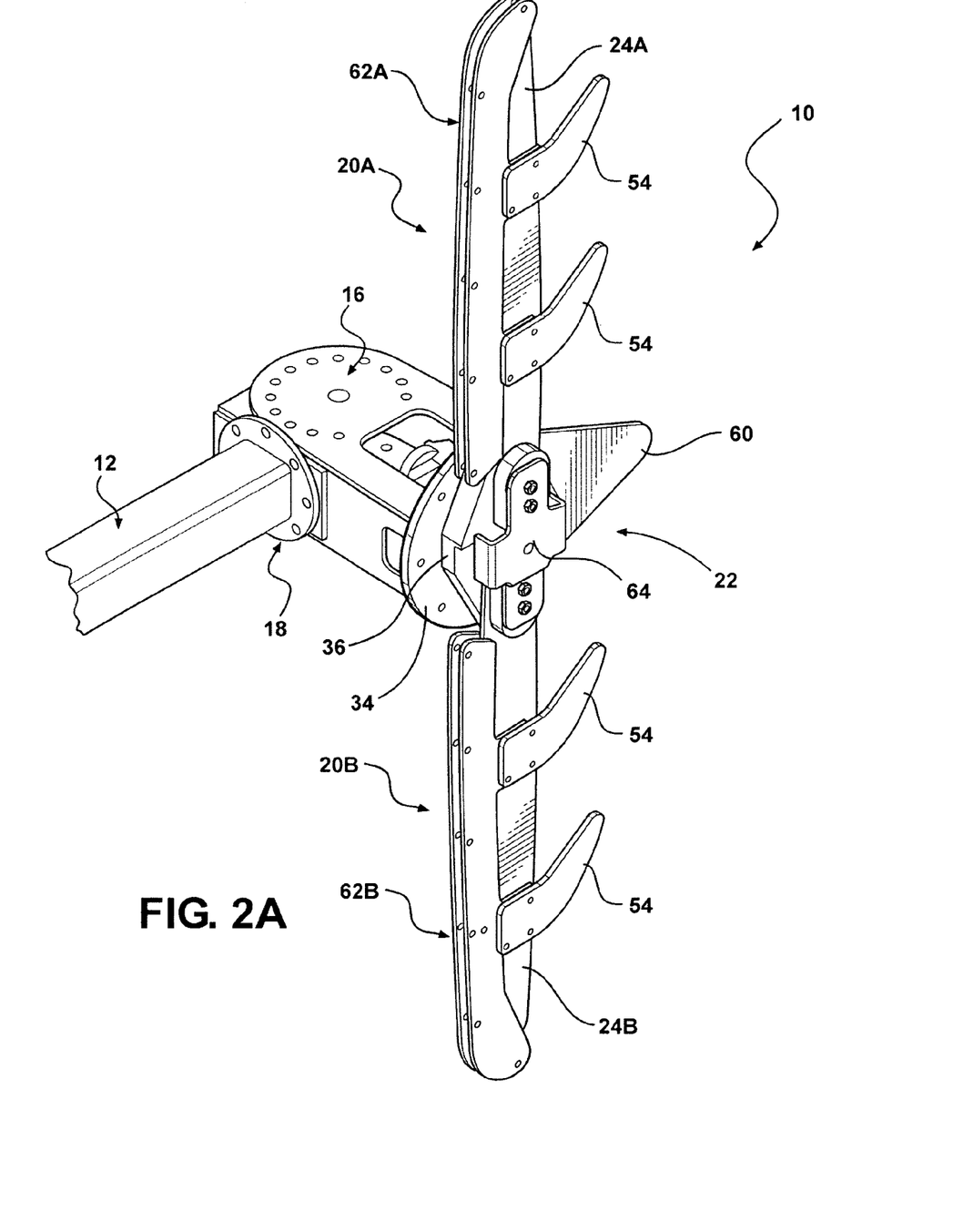
FIG. 2A is an enlarged pictorial view of the double chain saw arrangement shown in FIG. 1 with a pivotal mount and a fragmentary portion of a supporting boom.
Figure 2B:
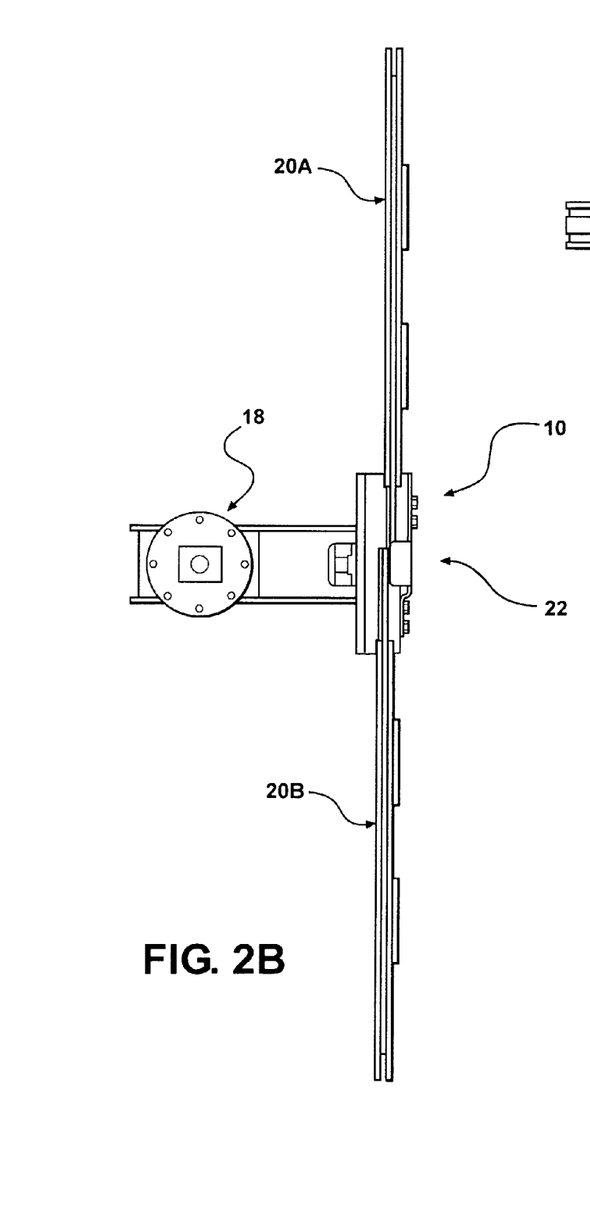
FIG. 2B is a side view of the double saw arrangement showing a different position of the pivot connection.
Figure 2C:
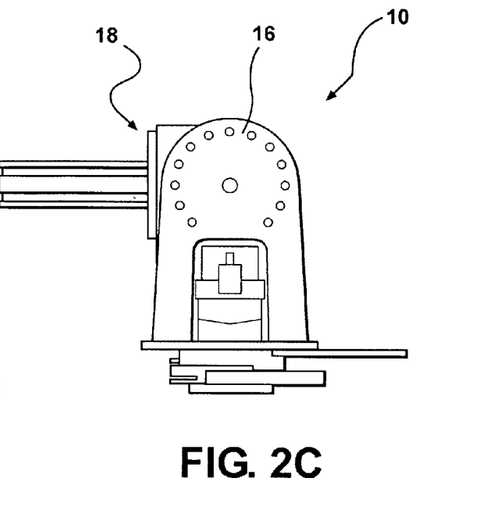
FIG. 2C is a side view of the double saw arrangement showing the second pivot connection.

The double chain saw arrangement 10 can be mounted to the end of the boom 12 in various orientations about two different axes by two manually adjusted pivot connections 16, 18 (FIGS. 2, 2A, 2B) as desired. A square tube connector piece 15 projects from connection 18 to allow mounting to the end of the boom 12

The details of these connections are not part of the present invention and hence are not here described further.

A double chain saw arrangement 10 according to the invention comprises the combination of two chain saws 20A, 20B connected to a hub 22 so as to extend end to end in diametrically opposite directions. This doubles the swath able to be cut by a single standard chain saw without requiring an expensive special long chain saw.

Both chain saws 20A, 20B include conventional chain saw bars 24A, 24B comprising flat pieces of steel having a round nose at one end and a slot at the other end secured to the hub 22. Saw chains 26A, 26B recirculate in a groove extending around the perimeter of respective bars 24A, 24B (FIG. 7) and around a respective drive sprocket 28A, 28B in the well known manner.

The sprockets 28A, 28B are both fixed on an output shaft 30 of a drive motor 32, such as a hydraulic motor 32. An electric motor can also be employed. A sprocket retainer 66 and spacer 68 hold the sprockets 28A, 28B in position on the shaft 30.

The chain saw bars 24A, 24B are preferably of a standard length and configuration, i.e., each 3 feet long to create a total cutting swath of six feet without resorting to expensive non-standard long length chain saws such as are used in logging large trees.

Figure 4:
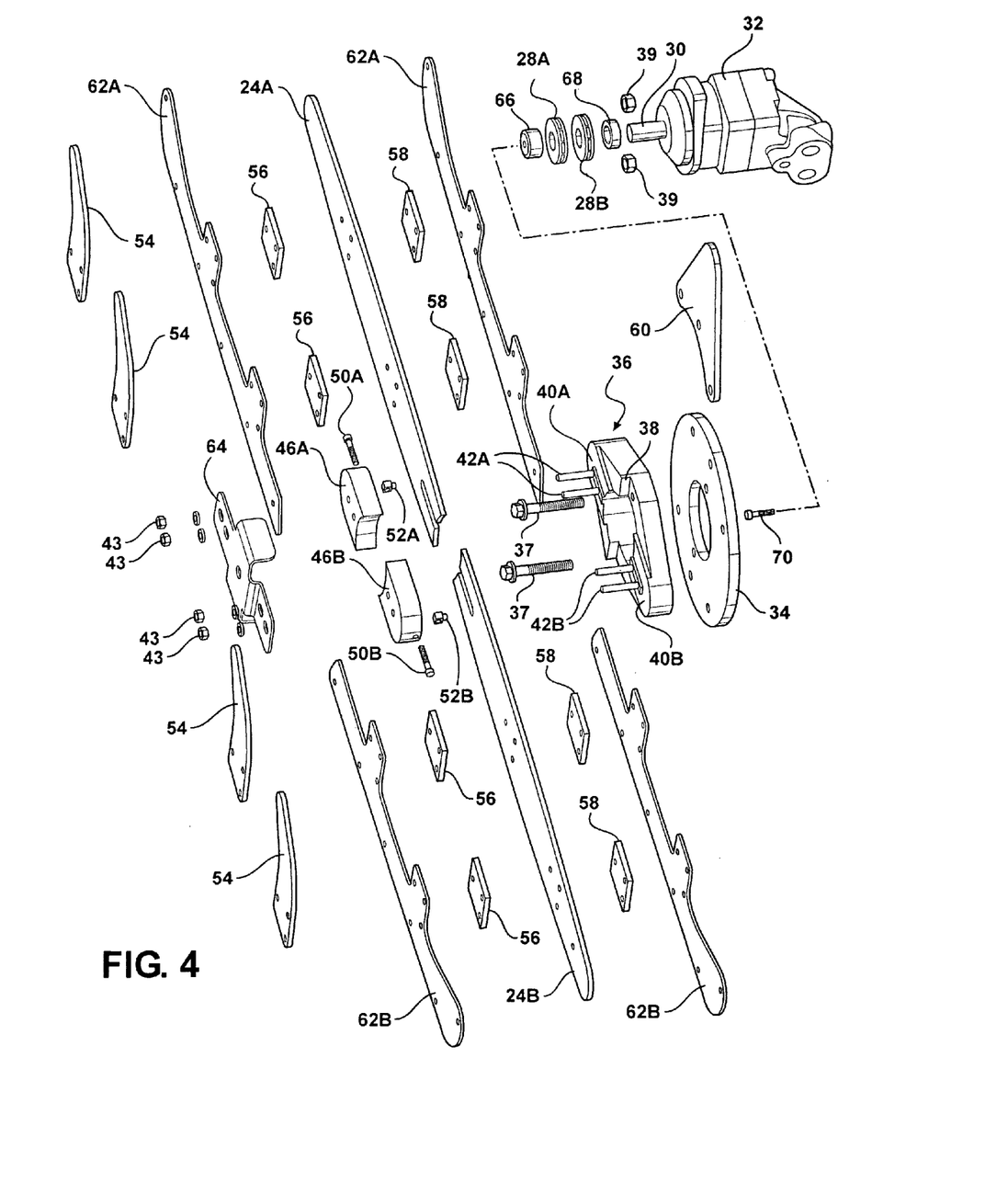
FIG. 4 is an exploded pictorial view of the components of the double chain saw arrangement shown in FIGS. 1-3.
Figure 5:
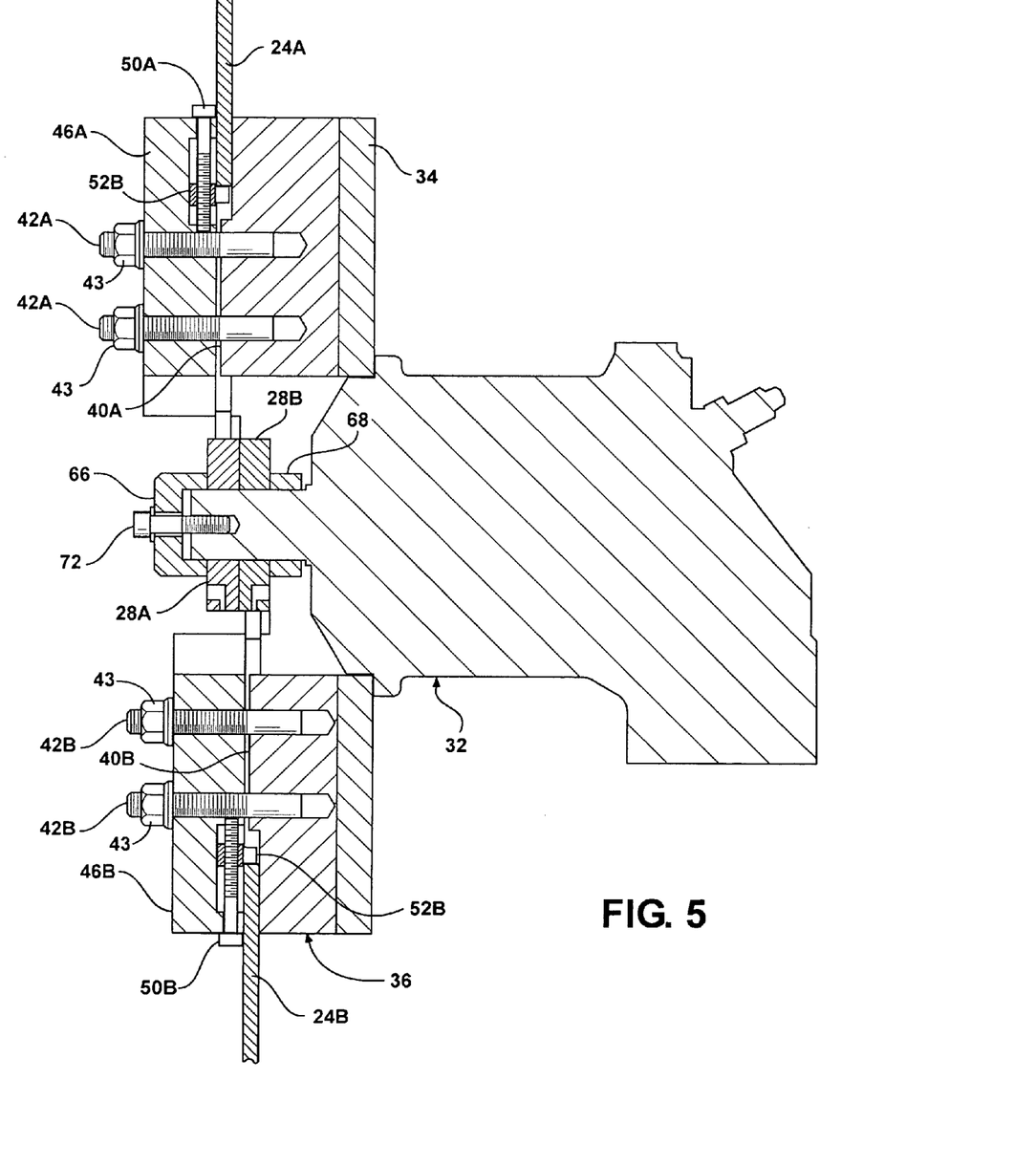
FIG. 5 is an enlarged sectional view of the center hub portion of the double chain saw arrangement shown in FIGS. 1-4
Figure 6:
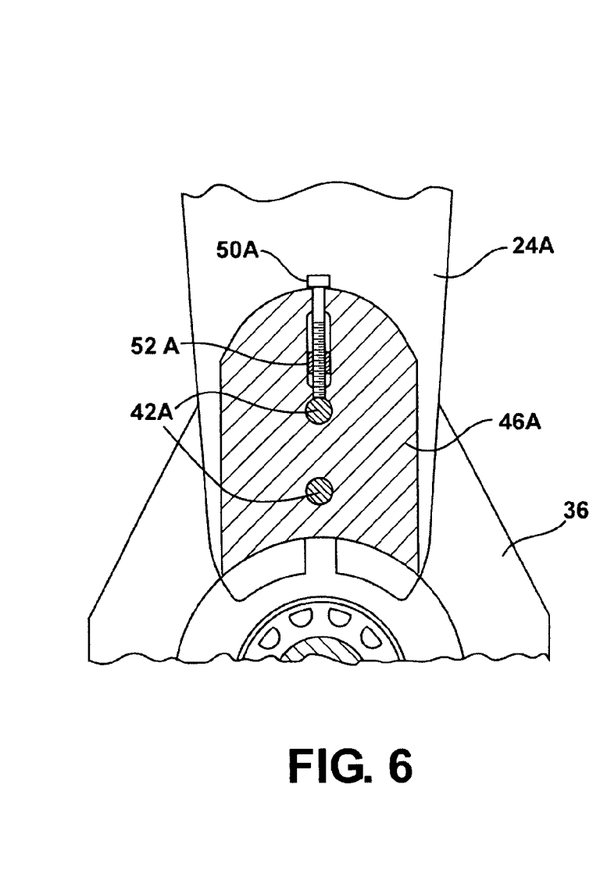
FIG. 6 is a fragmentary end view of hub components shown in FIG. 5.
Figure 7:
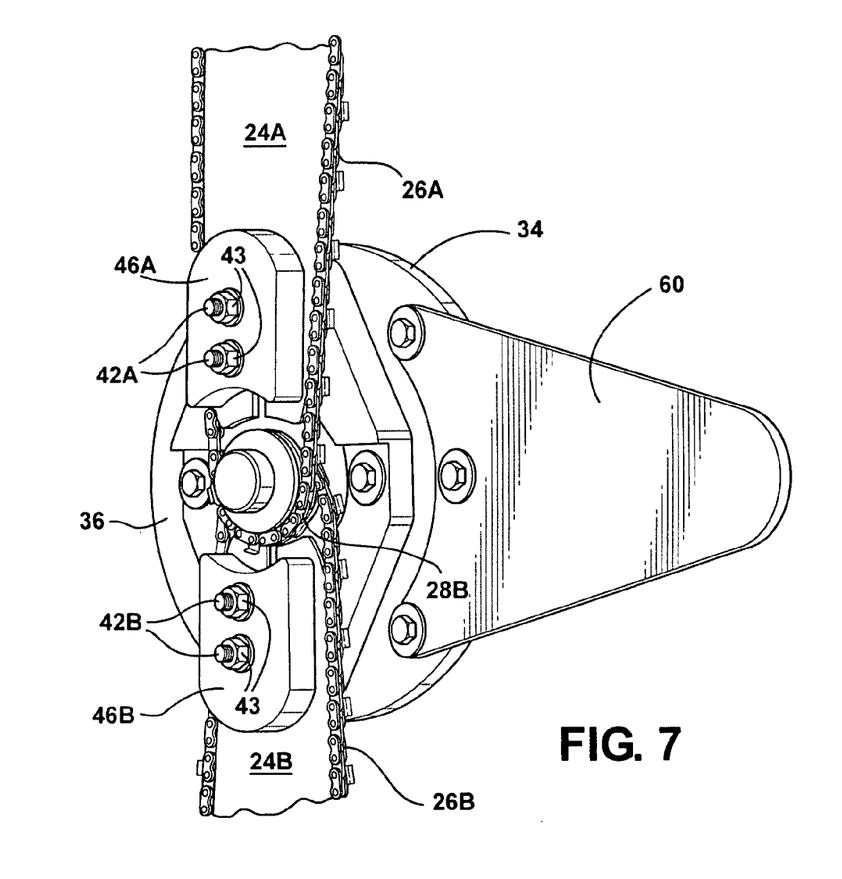
FIG. 7 is a fragmentary pictorial end view of the hub showing the sprockets and adjacent portions of the chain saw bars and saw chains.

The hub 22 includes an index mount plate 34 having a bore receiving the motor 32 and attached to a chain saw bar mounting plate 36 with bolts 37 and nuts 39 (FIGS. 4 and 7).

The chain saw bar mounting plate 36 has a step 38 providing two mounting faces 40A, 40B for the respective bars 24A, 24B against which the bars 24A, 24B are respectively clamped as described below. This step 38 slightly offsets the bars 24A, 24B so as to be aligned with the side by side sprockets 28A, 28B.

The bar mounting plate 36 has pairs of studs 42A, 42B secured therein aligned on a rib 44A, 44B projecting into the conventional lengthwise extending end slot in each chain saw bar 24A, 24B to positively hold the bars 24 in their opposing orientation.

Separate chain saw bar mounting plates 46A, 46B have holes aligned with the studs 42A, 42B so as to receive the same and be secured with nuts 43, to enable clamping the inner ends of the bars 24A, 24B to the respective face 40A, 40B installed thereon. The studs 42A, 42B pass through the end slots in the bars 24A, 24B in similar fashion to conventional chain saws.

Each of the conventional chain loops 26A, 26B (FIG. 7) recirculating in tracks in the bars 24A, 24B and around a respective sprocket can be periodically tensioned in a conventional fashion, as by advancing adjusting screws 50A, 50B received in the plates 46A, 46B and threadedly engaging a respective traveler 52A, 52B each have a projecting pin which protrudes into the associated chain saw bar end slot to advance of the bars 24A, 24B allowed when the nuts 48 are loosened. Thereafter are the nuts 48 retightening when the correct chain tension is achieved.

Figure 3:
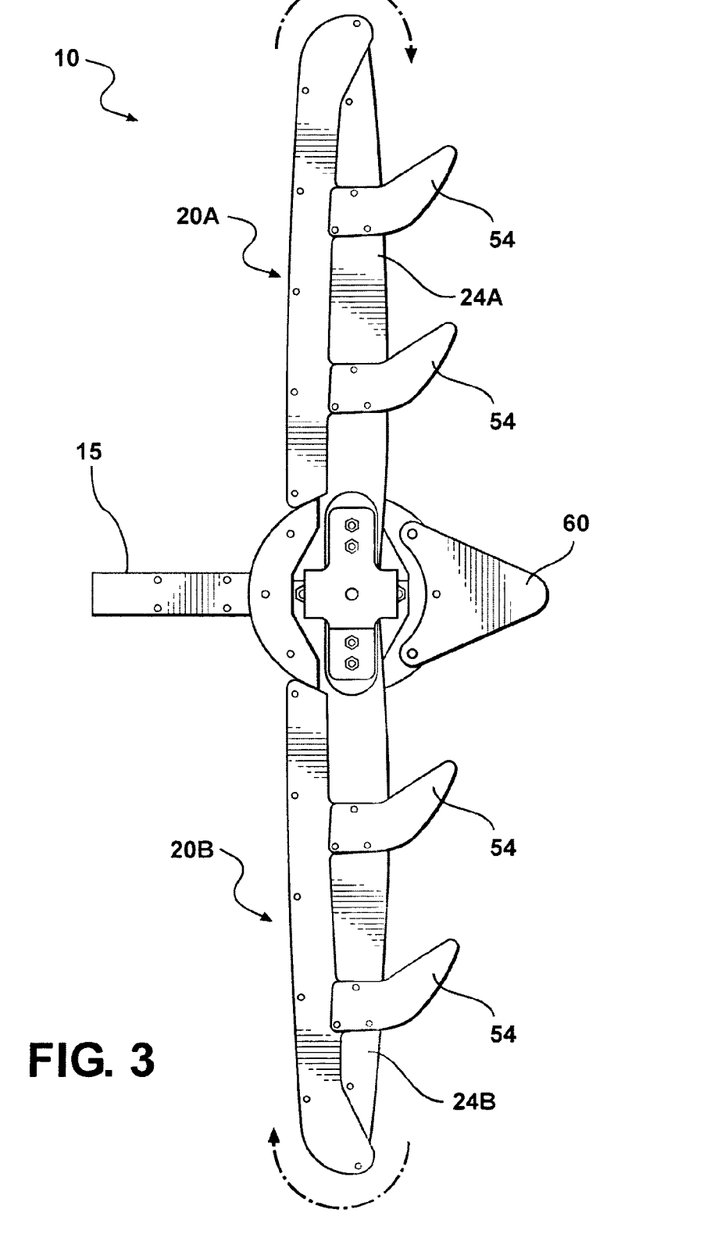
FIG. 3 is a front view of the double chain saw arrangement shown in FIGS. 1 and 2.

According to another aspect of the invention a series of brush-limb capture pieces 54 are attached along one side of each bar 24A, 24B. The pieces 54 are mildly hooked towards the direction of advance of the chains 26A, 26B (indicated in FIGS. 3 and 7), which is the same for both chains since the sprockets 28A, 28B are rotated in the same direction. The capture pieces 54 lie in a plane parallel to the plane of the bars 24A, 24B and project out past the saw chains 26A, 26B, so that spacers 56 are provided to insure that no interference between the chains 26A, 26B and the capture pieces 54 will occur. Clamping plates 58 receive suitable threaded fasteners to attach the capture pieces 54 to one side of the bars 24A, 24B. The motion of the chains 26A, 26B and the boom 12 carries brush and limbs against the capture pieces 54 which then holds them against the chain to insure subsequent complete cutting by the chains 26A, 26B.

A center guide plate 60 has opposite sloping sides to move the brush and limbs into either of the chains 24A, 24B.

Cover pieces 62A, 62B are installed on the rear side of the bars 24A, 24B to protect against impacts and the entanglement of brush with the return run of the chains 26A, 26B.

A center cover guard 64 is installed over a sprocket retainer 66 to protect the sprocket components and chain segments passing around the sprockets 28A, 28B.

The invention claimed is:

1. A brush and tree limb clearing double chain saw arrangement comprising:

two chain saw bars connected at one end to a central hub, each chain saw bar extending in substantially opposite end to end directions away from said hub to approximately double the swath able to be cut by said arrangement;

a pair of aligned chain sprockets on said hub mounted side by side on an output shaft driven by a common drive motor mounted to said hub;

each sprocket engaged by a respective saw chain recirculated around an associated chain saw bar and sprocket, with one of the saw chain portions when traveling on an upper side of an associated chain saw bar moving towards an associated sprocket and the other saw chain portions when traveling along an upper side of said associated chain saw bar moving away from an associated socket so that both of said chains travel along their respective chain saw bars' upper sides in the same direction;

a series of elongated brush and limb capture pieces attached to each of said chain saw bars to project out laterally past said upper side of both of said saw chains, angled back towards the direction from which both of said saw chains move on said a respective chain saw bar upper sides, said capture pieces tending to capture brush or limbs and draw the same against a respective saw chain for cutting therewith when said upper sides of said chain saws are moved broadside into said brush and limbs.

2. The double chain saw arrangement according to claim 1 wherein said chain saw bars are offset on said hub to be aligned with a respective sprocket.

3. The double chain saw arrangement according to claim 1 wherein said hub comprises a common clamping plate on one side of said chain saw bars formed with a step to offset the two bars to be aligned with a respective sprocket, and a pair of individual clamping plates each disposed against the other side of a respective chain saw bars and attached to said common clamping plate in a position with said saw bars extending in directly opposite directions.

4. The double chain saw arrangement according to claim 1 further including a center guide plate projecting from said hub in the same general direction as said capture plates pieces and having respective sides sloping towards a respective chain saw bar.

5. The double chain saw arrangement according to claim 1 further including a spacer interposed between each capture piece and an associated chain saw bar to locate said capture pieces beyond said saw chain on said chain saw bar.

6. The double chain saw arrangement according to claim 1 in combination with a vehicle wherein said hub is attached to an end of a boom mounted on said vehicle to be maneuvered by motion of said boom and said vehicle, said hub attached to said boom end by a connection allowing rotation of said double chain saw arrangement on said boom end to reorient said double chain saw arrangement on said boom end.

7. The combination of claim 6 wherein said connection allows reorientation of said double chain saw arrangement on said boom end about two different axes, one axis generally aligned with a longitudinal axis of said boom and another axis extending transversely to said boom axis.

* * * * *